United States Patent
Qu et al.

(10) Patent No.: US 7,455,111 B2
(45) Date of Patent: Nov. 25, 2008

(54) COMPOSITIONS FOR TREATING A WELL PENETRATING A SUBTERRANEAN FORMATION AND USES THEREOF

(75) Inventors: Qi Qu, Spring, TX (US); Richard F. Stevens, Jr., Sugar Land, TX (US); David Alleman, Houston, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 11/701,685

(22) Filed: Feb. 2, 2007

(65) Prior Publication Data

US 2007/0135310 A1   Jun. 14, 2007

Related U.S. Application Data

(62) Division of application No. 10/932,965, filed on Sep. 2, 2004, now Pat. No. 7,188,676.

(51) Int. Cl.
*E21B 37/00* (2006.01)
*E21B 43/25* (2006.01)
*C09K 8/524* (2006.01)
*C09K 8/528* (2006.01)

(52) U.S. Cl. .............. 166/304; 166/305.1; 166/307; 166/312; 507/930; 507/931

(58) Field of Classification Search ............ 166/279, 166/304, 305.1, 307, 310, 312, 371; 507/235, 507/237, 238, 260, 267, 277, 930, 931
See application file for complete search history.

(56) References Cited

U.S. PATENT DOCUMENTS

| | | | |
|---|---|---|---|
| 2,343,136 A * | 2/1944 | Dobson et al. | 507/201 |
| 3,625,286 A | 12/1971 | Parker | |
| 3,799,874 A | 3/1974 | Parker | |
| 3,850,248 A | 11/1974 | Carney | |
| 4,233,162 A | 11/1980 | Carney | |
| 4,359,391 A * | 11/1982 | Salathiel et al. | 507/277 |
| 4,445,576 A | 5/1984 | Drake et al. | |
| 4,588,845 A | 5/1986 | Bull | |
| 4,594,170 A | 6/1986 | Brown | |
| 5,247,995 A | 9/1993 | Tjon-Joe-Pin et al. | |
| 6,138,760 A | 10/2000 | Lopez et al. | |
| 6,730,234 B2 | 5/2004 | Symens et al. | |
| 6,978,838 B2 | 12/2005 | Parlar et al. | |
| 7,134,496 B2 * | 11/2006 | Jones et al. | 166/278 |
| 7,188,676 B2 * | 3/2007 | Qu et al. | 166/312 |
| 2005/0202978 A1 * | 9/2005 | Shumway | 507/203 |

FOREIGN PATENT DOCUMENTS

EP   0 559 418 A2   8/1993

* cited by examiner

*Primary Examiner*—George Suchfield
(74) *Attorney, Agent, or Firm*—Jones & Smith, LLP; John Wilson Jones

(57) ABSTRACT

Fluid producing wells may be treated with a water-in-oil emulsion for the removal or inhibition of unwanted solid particulates, including pipe dope, asphaltenes and paraffins. Such emulsions are of particular applicability in the displacement of oil base drilling muds and/or residues from such muds from producing wells. The water-in-oil emulsions may optionally contain a dispersing agent as well as a surfactant.

14 Claims, No Drawings

COMPOSITIONS FOR TREATING A WELL PENETRATING A SUBTERRANEAN FORMATION AND USES THEREOF

FIELD OF THE INVENTION

The invention relates to the use of water-in-oil emulsion compositions for use in oil field production. Such compositions have particular applicability in the removal of drilling muds, scale, heavy crude, paraffins and/or asphaltenes from subterranean formations.

BACKGROUND OF THE INVENTION

Efficiency in the overall production of fluids and gases from a well is highly dependent on the effectiveness of production chemicals. Such production chemicals include completion fluids as well as treatment solutions for production stimulation. For example, aqueous acid solutions are often used to increase the permeability of a formation by injection of an aqueous acid solution into the formation so that mineral constituents are dissolved and flow channels are produced. In these methods, difficulties are often encountered due to water-in-oil emulsions (having crude oil deposits as the outer phase) which are formed downhole at the interfaces between the injected aqueous treating solutions and crude oil contained in the formations. Fines and insoluble reaction products which are formed accumulate at the oil-water interfaces and stabilize the emulsions which in turn tend to plug the pore spaces in the formations being treated, thereby restricting the flow of the treating solutions and subsequent production of fluids therethrough. While a variety of additives having surface active properties have been developed for preventing the formation of emulsions, sludge, etc., as well as preventing the corrosion of metal surfaces, and have been included in the various treating solutions employed, less than desirable results are often achieved.

In addition, and particularly where aqueous acid treating solutions are utilized, sludge formed as a result of the reaction of the acid with asphaltic materials contained in the crude oil can plug the pore spaces of the formations.

Other solid particulates are known to negatively impact the overall efficiency of completion of the well. These include asphaltene and paraffin deposits and scales, such solid particulates include residues from drilling muds. Commonly employed drilling muds are gaseous or liquid. Liquid drilling muds have a water base or an oil base. The aqueous phase of the more common water-base muds may be formed of fresh water, or, more typically, a brine. As a discontinuous or disperse phase, water-base fluids may contain gases or water-immiscible fluids, such as diesel oil, in the form of an oil-in-water emulsion, and solids including weighting materials, such as barite. Water-base fluids also typically contain clay minerals, polymers, and surfactants for achieving desired properties or functions.

Oil base fluids have a continuous phase based on synthetic or non-synthetic oil and, eventually, an aqueous phase dispersed in the oil phase. Oil-base drilling muds provide shale inhibition, lubrication, gauge hole, and higher rates of penetration and deeper bit penetration and therefore, may often be preferred over water-base muds. Oil-base muds are usually more difficult to remove however due to the hydrophobic nature of the mud.

Asphaltenes are most commonly defined as that portion of crude oil which is insoluble in heptane. Asphaltenes exist in the form of colloidal dispersions stabilized by other components in the crude oil. They are the most polar fraction of crude oil, and often will precipitate upon pressure, temperature, and compositional changes in the oil resulting from blending or other mechanical or physicochemical processing. Asphaltene precipitation occurs in pipelines, separators, and other equipment. Once deposited, asphaltenes present numerous problems for crude oil producers. For example, asphaltene deposits can plug downhole tubulars, wellbores, choke off pipes and interfere with the functioning of separator equipment.

Unwanted particulates not only cause a restriction in pore size in the rock formation (formation damage) and hence reduction in the rate of oil and/or gas production, but also cause blockage of tubular and pipe equipment during surface processing. It is well known that production efficiency increases if such unwanted solid particulates are removed from the wellbore.

To remove such particulates, the production well is generally subjected to shut-in, whereby compositions are injected into the production well, usually under pressure, and function to remove the unwanted particulates. Shut-ins need to be done regularly if high production rates are to be maintained and constitutes the down time when no production takes place. Over the year there is a reduction in total production corresponding to the number of down times during the shut-in operation.

Production is decreased when ineffective chemicals are used during shut-in. For instance, ineffective scale inhibitors fail to reduce total scale build-up. Poor displacement of drilling mud results in solid residues and mud residues left in the wellbore which, in turn, typically leads to formation damage, etc. Similar displacement or mud removal procedures are also performed before cementing. Mud residue can lead to weak bonding between cement and the formation surface and gas leakage when the well is turned to production.

The prior art has recognized the use of surfactants in the displacement and removal of oil base muds. Surfactants are first dissolved in fresh water or seawater at the concentration of 5 volume percent or more and the resulting liquid is then pumped at sufficient rate to generate turbulent flow to facilitate the mud cleaning process. Although surfactant systems have been widely used in field applications, their effectiveness is often limited by solvency capacity. In addition, the efficiency of surfactant systems varies for different muds and is negatively impacted by the condition of the mud when the displacement is conducted. Pure organic solvent is often effective in mud displacement process, especially in cases where surfactant systems are not effective. In most cases, due to strong solvency of the organic solvent toward the base oil in oil based mud, solvent has shown good mud removal and cleaning effects in both laboratory and field applications. However, pure organic solvent is generally expensive and, since it has been effective only when used in 100% pure form, it often becomes cost prohibitive. Although water can be mixed with organic solvent to cut the fluid cost, the effectiveness of the system can be greatly reduced, even at levels as low as 10 to 20 volume percent of water content. In other cases, especially when solid content in the mud or mud residue is high and the mud viscosity is significant, pure solvent is often not effective.

Organic solvents are further often used in formation cleanup or near wellbore damage removal when the damage is caused by asphaltene or paraffin deposition as well as scale deposition. Very often the solvents are aromatic and leave an environment footprint. In other cases, the solvent is not effective, especially when suspension and dispersion of solids is desired. Pure organic solvents cannot effectively break up solid aggregation and does not facilitate solid suspension.

Improved production chemicals are therefore desired for the treatment of fluid producing wells which are capable of removing or inhibiting the formation of unwanted particulates within the well. Accordingly, the present invention is a process for increasing the effectiveness of production chemicals by reducing the number and duration of shut-in operations needed to increase the production rate from an oil well.

SUMMARY OF THE INVENTION

A well penetrating a subterranean formation is treated, in accordance with the invention, with a water-in-oil emulsion. Such emulsions are useful in treating a fluid producing well. In addition, such emulsions may be introduced into an injection well. Such emulsions are capable of removing or inhibiting the formation of unwanted solid particulates, including pipe dope, asphaltenes and paraffins, within the well and further serve to improve the permeability of the formation. Such emulsions are particularly efficacious in displacing oil based drilling muds and/or residues from such muds from producing wells.

The water-in-oil emulsions may optionally contain a dispersing agent as well as a surfactant. The dispersing agent may act as a pH adjusting agent. The water phase may further include scale inhibitors, pH adjusting agents, corrosion inhibitors, rust removing agents, bactericides, hydrogen sulfide scavengers, and/or other oil producing additives.

The water-in-oil emulsion used in the invention provides excellent particle suspension capacity. Such capacity prevents particulates from redepositing within the well, e.g., on tubings, casings or the formation surface.

DETAILED DESCRIPTION OF THE PREFERRED EMBODIMENTS

The water-in-oil emulsion, or reverse emulsion, for use in the invention consists of an outer (or continuous) hydrophobic phase which is particularly useful in dissolving the oil residues. In addition, the outer phase is particularly useful in dissolving unwanted particulates or loosening such particulates, like asphaltene and/or paraffin, which have been deposited within the well. It is also useful to remove pipe dope routinely used to prevent seizing when pipe connections are made. The internal (or discontinuous) phase of the water-in-oil emulsion is water, to which may be added any conventional additive used to treat unwanted particulates. As such, the emulsion of the invention is useful in improving the permeability of the formation by introducing into the formation the water-in-oil emulsion and then removing unwanted particulates in the formation.

The aqueous internal phase may be an aqueous salt solution such as sodium bromide brine, calcium bromide brine, zinc bromide brine or calcium chloride brine. The use of such salts may be used t( increase the density of the water-in-oil emulsion in those situations where higher density is sought at the interface. (Reference herein to "water" as the internal phase of the water-in-oil emulsion shall include such aqueous salt solutions.)

In a preferred embodiment, the external phase is a hydrophobic organic solvent. Mixtures of organic solvents may also be used. The hydrophobic organic solvent is either non-miscible in or slightly miscible with water. Preferred solvents include aromatic petroleum cuts, terpenes, mono-, di- and tri-glycerides of saturated or unsaturated fatty acids including natural and synthetic triglycerides, aliphatic esters such as methyl esters of a mixture of acetic, succinic and glutaric acids minerals oils such as vaseline oil, chlorinated solvents like 1,1,1-trichloroethane, perchloroethylene and methylene chloride, deodorized kerosene, solvent naphtha, paraffins, isoparaffins, olefins and aliphatic or aromatic hydrocarbons (such as toluene). Terpenes are preferred, especially d-limonene (most preferred), 1-limonene, dipentene (also known as 1-methyl-4-(1-methylethenyl)-cyclohexene), myrcene, alpha-pinene, linalool and mixtures thereof.

Further exemplary organic liquids include long chain alcohols (monoalcohols and glycols), esters, ketones (including diketones and polyketones), nitrites, amides, cyclic ethers, linear ethers, pyrrolidones, N-alkyl piperidones, N,N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, and alkylene or alkyl carbonates. These include polyalkylene glycols, mono (alkyl or aryl) ethers of glycols, mono (alkyl or aryl) ethers of polyalkylene glycols, monoalkanoate esters of glycols, monoalkanoate esters of polyalkylene glycols, dialkyl ethers of polyalkylene glycols, dialkanoate esters of polyalkylene glycols, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene zarbonate, diethyl carbonate, ethylmethyl carbonate, and dibutyl carbonate, lactones, nitromethane, and nitrobenzene sulfones. The organic liquid may also be selected from the group consisting of tetrahydrofuran, dioxane, dioxolane, methyltetrahydrofuran, dimethylsulfone, tetramethylene sulfone, and thiophene.

The composition for use in the invention may further contain a surfactant. The surfactant is preferably hydrophobic though it may be characterized as having portions which are strongly attracted to each of the phases present, i.e., hydrophilic and hydrophobic portions. Suitable surfactants include non-ionic as well as ionic surfactants.

Suitable surfactants include acetylated monoglycerides, sorbitan esters including polyoxyalkylene sorbitan esters, lecithins, polyoxyl castor oil derivatives, macrogol esters, caprylic/capric triglycerides, polyoxyalkylated glycolysed glycerides, mixture of mono-, di- and triglycerides and mono- and di-fatty esters of polyalkylene glycol. Preferred are fatty acids such as $C_8$-$C_{10}$caprylic/capric acids, polyethyleneglycol hydrogenated castor oil, polyethyleneglycol glyceryl esters, lecithin, cholesterol and proteins such as casein. Multiple emulsifying agents can further be used.

Suitable surfactants further include ionic as well as non-ionic compounds, including those having a hydrophilic lipophilic balance (HLB) in the range of about 2 to about 10. Examples of these surfactants are alkanolamides including fatty acid diethanolamides, alkylarylsulfonates, amine oxides, poly(oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, glycerol esters, glycol esters, lecithin and derivatives, lignin and derivatives, monoglycerides and derivatives, olefin sulfonates, phosphate esters and derivatives, propoxylated and ethoxylated fatty acids or alcohols or alkyl phenols, amine oxides, sorbitan derivatives such as sorbitan fatty acid esters, sucrose esters and derivatives, alcohols or ethoxylated alcohols or fatty esters, sulfonates of dodecyl and tridecyl benzenes or condensed naphthalenes or petroleum, sulfosuccinates and derivatives, and tridecyl and dodecyl benzene sulfonic acids.

Included within nonionic surfactants are alkyl alkoxylates and those wherein the hydrophilic part of the molecule contains one or more saccharide unit(s) such as those derived from sugars like fructose, glucose, mannose, galactose, talose, gulose, allose, altose, idose, arabinose, xylose, lyxose and/or ribose, including alkylpolyglycosides.

The ionic surfactants can further be amphoteric such as alkyl betaines, alkyldimethyl betaines, alkylamidopropyl betaines, alkylamido-propyldimethyl betaines, alkyltrimethyl sulfobetaines, imidazoline derivatives such as alkylamphoacetates, alkylamphodiacetates, alkylamphopropionates, alkylamphodipropionates, alkylsultains or alkylamidopropyl hydroxysultains, or the condensation products of fatty acids and protein hydrolysates.

Anionic surfactants can further include hydrosoluble salts of alkylsulfates, alkylethersulfates, alkylsulfonates, amine oxides, alkylisethionates and alkyltaurates or their salts, alkylcarboxylates, alkylsulphosuccinates or alkylsuccinamates, alkylsarcosinates, alkylated derivatives of protein hydrolysates, acylaspartates, and alkyl and/or alkylether and/or alkylarylether ester phosphates. The cation is generally an alkali or alkaline-earth metal such as sodium, potassium, lithium, magnesium or an ammonium group $NR_4^+$ where R, which may be identical or different, represents an alkyl radical which may or may not be substituted by an oxygen or nitrogen atom.

The surfactant when present is in a quantity sufficient to maintain the present composition as an emulsion. In one embodiment, it is present at a level of about 0.005 to about 20 weight percent, preferably from about 0.005 to about 10 weight percent.

The emulsion may be formed by conventional methods, such as with the use of a homogenizer, with the application of shear. Emulsifiers may also be added to the emulsion to help stabilize and further facilitate formation of the emulsion.

The water-in-oil emulsion for use in the invention is preferably prepared by first mixing the surfactant, capable of forming the emulsion, with the hydrophobic organic solvent. A dispersing agent is then added and finally an appropriate amount of water may be added, all under agitation. The resulting water-in-oil emulsion consists of an outer oil (organic) phase and is particularly useful in dissolving the base oil and oily solid aggregates from the oil base muds as well as dissolving or loosening asphaltene and/or paraffin deposits. The inner water phase further is characterized by a low pH and is capable of dispersing the unwanted solids from the mud as well as paraffin and/or asphaltene deposits.

At least a portion of the solvent may be replaced with water. Mixing water with the organic solvent minimizes the expense of producing the emulsion. The amount of water which may be added to the organic solvent is an amount that will maintain the hydophobicity of the organic solvent. Typically the amount of water forming the water-in-oil emulsion is between from about 10 to about 90, preferably between from about 20 to about 80, volume percent.

The dispersing agent serves to disperse the solids upon the in situ removal of oil or organic deposits mixed with solid particles. The dispersing agent is preferably an inorganic or organic acid or salts or esters and may, optionally, function as a pH adjusting agent.

Preferred dispersing agents include organophosphate esters, including salts thereof, such as alkali metal salts. These embrace a diversity of predominantly partially esterified phosphorus containing surface active materials, including alkyl orthophosphates, e.g., mono (2-ethylhexyl) orthophosphate and di(2-ethylhexyl) orthophosphate and mixtures thereof, as well as partial esters of polyphosphoric acids, glycerophosphoric acid, sugar phosphates, phosphatidic acids having long-chain fatty acyl groups, amino phosphoric acids, and partial phosphate esters of nonionic surfactants.

Exemplary and preferred partial phosphate ester dispersants include, for example, phosphated polyoxyethylated nonylphenols; cetyl phosphates and oxyethylated cetyl phosphates; mono or di phosphate esters made from aromatic (phenols) or linear alcohols, usually polyoxyethylated; and phosphated fatty glycols.

Suitable dispersing agents include aliphatic phosphonic acids with 2-50 carbons, such as hydroxyethyl diphosphonic acid, and aminoalkyl phosphonic acids, e.g. polyaminomethylene phosphonates with 2-10N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

The amount of dispersing agent added to the composition is an amount sufficient to maintain the dispersed particles in dispersion. Typically the amount of dispersing agent to the composition is between from about 0.5 to about 25 weight percent (based on the total weight of the composition).

The composition may further contain a suitable amount of a pH modifying agent such as mineral acids (like hydrochloric acid), organic acids (like formic acid, acetic acid, or citric acid), and chelating agents, in particular cationic salts of polyaminocarboxylic acids chelating agents. For instance, a 10% HCl could be used to lower the pH to about −1.0. The pH of the formulation is suitably from about −0.1 to about 6.0.

The aqueous inner phase may further contain any additive used in the art to improve productivity, such as corrosion inhibitors, scale inhibitors, rust removers, hydrogen sulfide scavengers and bactericides. Such agents may be used in place of or in combination with the dispersing agent. The scale inhibitor is effective in stopping calcium and/or barium scale with threshold amounts rather than stoichiometric amounts. It may be any used in the art, such as water-soluble organic molecule with at least 2 carboxylic and/or phosphonic acid and/or sulfonic acid groups e.g. 2-30 such groups, or an oligomer or a polymer, or may be a monomer with at least one hydroxyl group and/or amino nitrogen atom, especially in a hydroxycarboxylic acid or hydroxy or aminophosphonic, or, sulfonic acid.

Examples of corrosion inhibitors are non-quaternized long aliphatic chain hydrocarbyl N-heterocyclic compounds.

The hydrogen sulfide scavenger may be an oxidant, such as an inorganic peroxide. e.g. sodium peroxide, or chlorine dioxide, or an aldehyde, e.g. of 1-10 carbons such as formaldehyde or glutaraldehyde or (meth)acrolein.

The water-in-oil formulations of the present invention may be prepared on the platform or can be transported as such to the site of use, where it is mixed with the aqueous medium in appropriate proportions to achieve the desired homogeneity and into which the chemical has been dissolved. Typically the aqueous medium can be formed from the carrier liquids for the dispersing agent and/or surfactants and/or optional additives.

In addition to treating fluid producing wells, the compositions of the invention have applicability in injection wells, wherein fluids are injected rather than produced, in order to maintain reservoir pressure.

The following non-limiting examples, and comparative demonstrations, bring out the more salient features of the invention. All parts are given in terms of weight units except as may otherwise be indicated.

EXAMPLE

This Example illustrates the displacement process for eliminating drilling mud components of solids and oil from a well system prior to introduction of solids-free completion and packer brine. The drilling mud is displaced from the well system by circulating therein. All percentages expressed herein are weight percentages.

The following chemicals were used in the example:

Paravan 25, a product of BJ Services Company, containing d-limonene, capable of cleaning oil or organic deposits;

SP-78, a product of Special Product Inc., an organophosphate dispersing agent which further functions as a pH reducing agent;

Viscoflex-X, a product of BJ Services Company, a surfactant comprising about 24.1% by weight of ethylene glycol monobutyl ether and about 75.9weight percent of lecithin. Viscoflex-X converts the oil-in-water emulsion to water-in-oil emulsion.

Two compositions were tested.

| Composition 1: | Composition 2: |
|---|---|
| 40% Paravan | 94% Paravan |
| 1% Viscoflex - X | 1% Viscoflex - X |
| 5% SP-78 | 5% SP-78 |
| 54% water | |

The compositions were used with sludge produced from a BP well of Venezuelan crude oil.

Mud displacement: 100 ml of mud sample was poured into a glass jar (4oz) to coat the wall completely and excess mud was poured out. 100 ml of Composition 1and 2was poured into a separate sludge treated jar and stirred under constant RPM. After a pre-defined time, the liquids were poured out and the jar was examined for mud removal efficiency. Composition 1 effectively removed the muds 100% within 5minutes. The organic solvent in Composition 1can be further reduced to 30% by volume. For Composition 2, a contact time of 10 minutes is needed for 100% cleaning efficiency.

Sludge and Paraffin/Asphaltene Removal: A mud sludge or crude with high content of paraffin/asphaltene was first coated on the inner surface of a glass jar. 100ml of Composition 1and 2was poured into the jar and stirred under constant RPM. After pre-defined time, the liquid was poured out and the jar was examined for mud removal efficiency. Composition 1completely removed heavy crude oil with high content of asphaltene from a glass jar within 7minutes of contact time. Composition 2cleaned all the mud and sludge 100% within 2minutes of contact time.

The Example demonstrates use of the invention as a spearhead fluid which can remove the heavy crude and asphaltene from the formation and leave its surface clean for subsequent well treatments.

From the foregoing, it will be observed that numerous variations and modifications may be effected without departing from the true spirit and scope of the novel concepts of the invention.

What is claimed is:

1. A method of improving the permeability of a subterranean formation which comprises introducing into the formation a composition comprising a water-in-oil emulsion and an organophosphate dispersing agent, wherein unwanted particulates deposited in the formation are dissolved or loosened by the outer phase of the water-in-oil emulsion, thereby improving the permeability of the formation.

2. The method of claim 1, wherein the dispersing agent is capable of lowering the pH of the composition to about -1.0.

3. The method of claim 1, wherein the unwanted particulates are asphaltene and/or paraffin deposits.

4. The method of claim 1, wherein the outer phase of the water-in-oil emulsion is an organic solvent.

5. The method of claim 4, wherein the organic solvent is selected from the group consisting of aromatic petroleum cuts, terpenes, mono-, di-and tri-glycerides of saturated or unsaturated fatty acids, esters, minerals oils, chlorinated hydrocarbons, deodorized kerosene, naphtha, paraffins, iso-paraffins, olefins, aliphatic and aromatic hydrocarbons, long chain alcohols, ketones, nitrites, amides, cyclic and linear ethers, pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene or alkyl carbonates, tetrahydrofuran, dioxane, dioxolane, methyltetrahydrofuran, dimethylsulfone, tetramethylene sulfone and thiophene and mixtures thereof.

6. The method of claim 1, wherein the inner phase of the water-in-oil emulsion comprises an aqueous salt solution selected from the group consisting of sodium bromide brine, calcium bromide brine, zinc bromide brine and calcium chloride brine.

7. The method of claim 1, wherein the composition further comprises at least one additive selected from the group consisting of scale inhibitors, scale removers, rust removal agents, corrosion inhibitors and bactericides.

8. The method of claim 7, wherein the a at least one additive is selected from the group consisting of scale inhibitors and scale removers.

9. A method of improving the permeability of a subterranean formation which comprises introducing into the formation a composition comprising a water-in-oil emulsion, wherein the external phase of the emulsion is a hydrophobic organic solvent comprising at least one terpene, and further wherein the emulsion stimulates the formation by removing and/or inhibiting unwanted particulates from the formation which thereby improves the permeability of the formation.

10. The method of claim 9, wherein the at least one terpene is selected from the group consisting of d-limonene, 1-limonene, dipentene, myrcene, alpha-pinene, linalool and mixtures thereof.

11. The method of claim 10, wherein the at least one terpene is d-limonene.

12. The method of claim 9, wherein the unwanted particulates are asphaltene and/or paraffin.

13. A method of improving the permeability of a subterranean formation which comprises introducing into the formation a composition comprising a water-in-oil emulsion, wherein the outer phase of the water-in-oil emulsion is a hydrophobic solvent selected from the group consisting of d-limonene, 1-limonene, dipentene, myrcene, alpha-pinene, linalool and mixtures thereof and further wherein unwanted particulates deposited in the formation are dissolved or loosened by the outer phase of the water-in-oil emulsion, thereby improving the permeability of the formation.

14. The method of claim 13 wherein the hydrophobic solvent is d-limonene.

* * * * *